US012197365B2

(12) United States Patent
Ogino

(10) Patent No.: US 12,197,365 B2
(45) Date of Patent: Jan. 14, 2025

(54) INFORMATION PROCESSING SYSTEM, IMAGE PROCESSING APPARATUS, AND COMMUNICATION CONTROL METHOD

(71) Applicant: Canon Kabushiki Kaisha, Tokyo (JP)

(72) Inventor: Kaoru Ogino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 256 days.

(21) Appl. No.: 17/972,679

(22) Filed: Oct. 25, 2022

(65) Prior Publication Data

US 2023/0143944 A1 May 11, 2023

(30) Foreign Application Priority Data

Nov. 10, 2021 (JP) .................................. 2021-183410

(51) Int. Cl.
*G06F 13/38* (2006.01)
(52) U.S. Cl.
CPC ................................... *G06F 13/38* (2013.01)
(58) Field of Classification Search
CPC ........................................................ G06F 13/38
See application file for complete search history.

(56) References Cited

U.S. PATENT DOCUMENTS 5,809,127 A * 9/1998 Ostreil ............... H04Q 11/0428
379/212.01
8,255,586 B2 * 8/2012 Choi ....................... H04L 67/12
710/16
10,162,549 B2 12/2018 Kuga
2009/0190549 A1 * 7/2009 Kim .................. H04W 36/0066
370/331

FOREIGN PATENT DOCUMENTS

JP 2002-099517 A 4/2002
JP 2016-218976 A 12/2016

* cited by examiner

*Primary Examiner* — Henry Tsai
*Assistant Examiner* — John B Roche
(74) *Attorney, Agent, or Firm* — Venable LLP

(57) ABSTRACT

Information processing systems including a plurality of integrated circuit chips have had problems such as an increased cost due to an increase in the number of terminals related to settings of an interface between the chips and delayed program transfer. An information processing system is provided in which a plurality of integrated circuit chips each include a plurality of communication units to be initialized by a common setting terminal. A processing execution unit of a first integrated circuit chip set to a first mode starts establishing a communication connection through one of the initialized communication units to one of the communication units of a second integrated circuit chip set to a second mode.

10 Claims, 14 Drawing Sheets

INFORMATION PROCESSING SYSTEM, IMAGE PROCESSING APPARATUS, AND COMMUNICATION CONTROL METHOD

FIELD OF THE DISCLOSURE

The present disclosure relates to an information processing system configured by using two or more integrated circuit chips.

DESCRIPTION OF THE RELATED ART

As apparatuses have become increasingly complicated in recent years, more and more apparatuses are configured with a plurality of integrated circuit chips. A challenge in such a situation is to reduce the number of constituent parts of the apparatus for cost reduction. To address this, a technique has been studied in which a program is transferred from one integrated circuit chip to another integrated circuit chip, thereby eliminating the need of an external ROM to be connected to this other integrated circuit chip (see Japanese Patent Laid-Open No. 2002-099517, for example).

Also, a method has been disclosed in which chips to serve respectively as a master and a slave are configured with identical chips in order to reduce the cost and man-hours for developing integrated circuit chips (see Japanese Patent Laid-Open No. 2016-218976, for example). In this method, setting terminals for, for example, setting a CPU boot mode and setting a communication mode setting are provided. With the CPU boot mode setting terminal, the boot of a CPU is stopped. A setting of the communication mode setting terminal, on the other hand, enables an interface unit to access the slave chip from the master chip. With these functions, the master chip can boot the CPU of the slave chip after transferring a program to the slave chip.

However, before the boot of the CPU of the slave chip, communication through the interface unit needs to be established. Hence, settings related to interface conditions between the master chip and the slave chip need to be set in advance before the communication is established. The interface conditions are settings related to signal quality such as signal amplitude and de-emphasis, for example. In conventional methods, the settings are set through an interface between the chips in a route other than that for the above-mentioned interface unit. However, a problem with this method is, for example, that the number of terminals of the integrated circuit chips increases according to the number of interfaces between the chips in other routes. For the development of integrated circuit chips in recent years, reducing the number of terminals is an important issue since an increase in the number of terminals leads to a higher cost.

Meanwhile, a method has also been employed in which no interface is provided between chips in another route and instead a program is transferred at a communication speed lowered to such an extent as not to be affected by settings related to signal quality. With this method, however, a large amount of program data must be communicated at a low speed, which leads to a problem such as requiring an extra time for the program transfer.

SUMMARY

An information processing system according to the present disclosure to solve the above-mentioned problem includes: a plurality of integrated circuit chips each including a processing execution unit that executes information processing in accordance with a program, and a communication unit that is caused by the processing execution unit to communicate with another one of the integrated circuit chips; and a mode setting unit capable of setting each of the integrated circuit chips to at least a first mode or a second mode. Here, each of the plurality of integrated circuit chips includes a plurality of the communication units to be initialized by a common setting terminal. The processing execution unit of a first integrated circuit chip set to the first mode starts establishing a communication connection through one of the initialized communication units to one of the communication units of a second integrated circuit chip set to the second mode.

Further features of the present invention will become apparent from the following description of exemplary embodiments with reference to the attached drawings.

BRIEF DESCRIPTION OF THE DRAWINGS

FIG. 1 is a diagram showing the relationship of FIGS. 1A and 1B;

FIG. 2 is a diagram showing the relationship of FIGS. 2A, 2B and 2C;

FIG. 5 is a diagram showing the relationship of FIGS. 5A, 5B and 5C;

FIG. 6 is a diagram showing the relationship of FIGS. 6A, 6B and 6C;

DESCRIPTION OF THE EMBODIMENTS

Embodiments of the present disclosure will be described in detail below with reference to the drawings.

First Embodiment

Figure 1A:
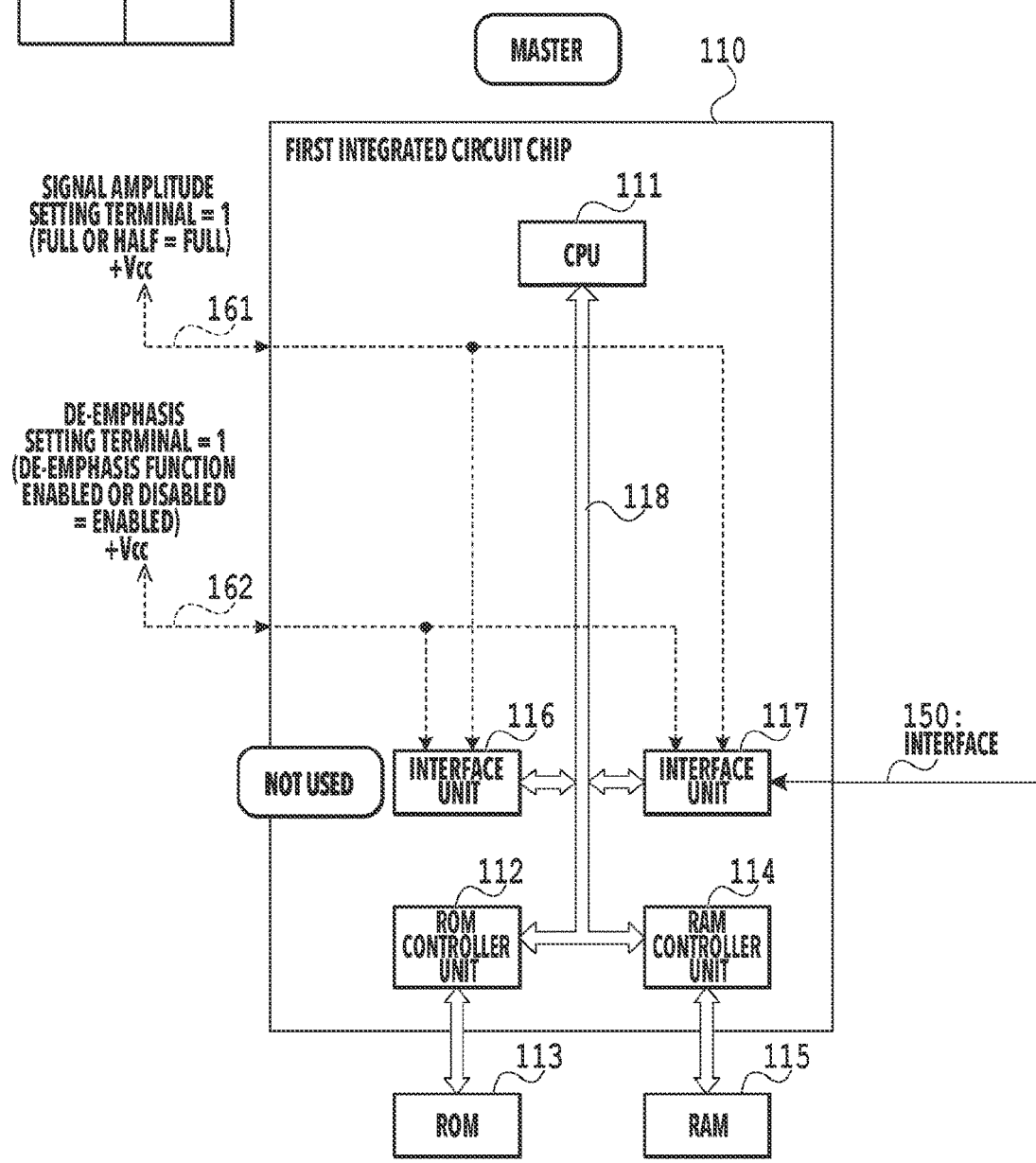
FIGS. 1A and 1B are block diagrams illustrating an example configuration of an information processing system in a first embodiment.
Figure 1B:
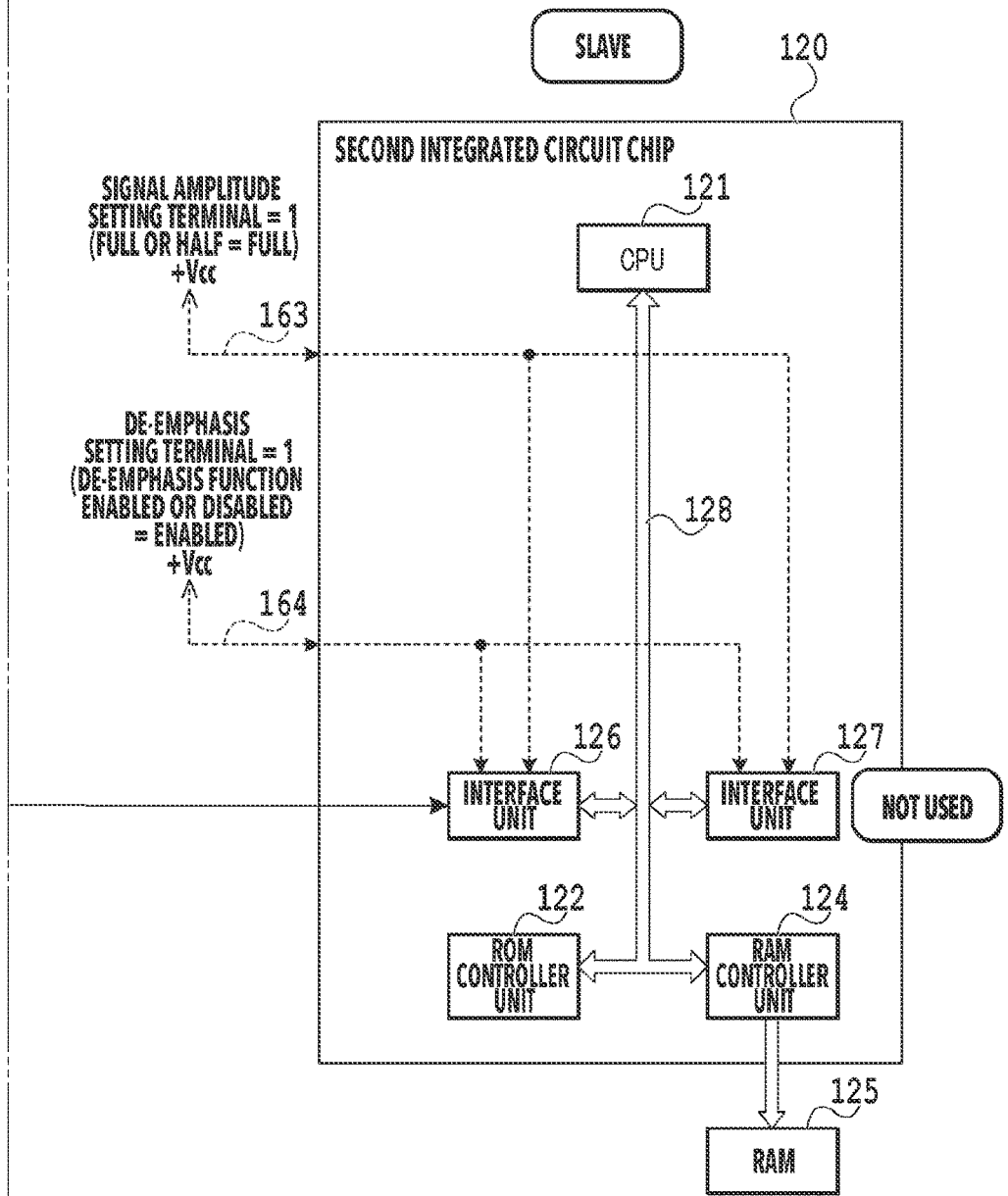

FIGS. 1A and 1B are block diagrams illustrating an example configuration of an information processing system with a 2-chip configuration in a first embodiment. The information processing system includes a first integrated circuit chip 110 and a second integrated circuit chip 120. A ROM 113 and a RAM 115 are connected to the first integrated circuit chip 110. To reduce the number of parts for cost reduction, no ROM is connected to the second integrated circuit chip 120, and only a RAM 125 is connected to it. The first integrated circuit chip 110 and the second integrated circuit chip 120 are connected through an interface 150 for performing communication.

The first integrated circuit chip 110 and the second integrated circuit chip 120 are integrated circuit chips having the same internal configuration with different memories connected thereto. Regarding functionality, on the other hand, the first integrated circuit chip 110 is an integrated circuit chip that operates in a first mode to serve as a master whereas the second integrated circuit chip 120 is an integrated circuit chip that operates in a second mode to serve as a slave. A mode setting unit for setting the mode to the first mode or the second mode will be described later.

The ROM 113 of the first integrated circuit chip 110 stores pieces of program data for causing the first integrated circuit chip 110 and the second integrated circuit chip 120 to operate. The first integrated circuit chip 110 sends the piece of program data of the second integrated circuit chip 120 stored in the ROM 113 through the interface 150. The second integrated circuit chip 120, in turn, receives the piece of program data through the interface 150 and stores it in the RAM 125. After that, the second integrated circuit chip 120 operates in accordance with this piece of program data.

Next, a configuration of the first integrated circuit chip 110 will be described. A CPU 111 is a processing execution unit that executes information processing in accordance with a program. The CPU 111 is connected through a main bus 118 to a ROM controller unit 112 connected to the ROM 113 and a RAM controller unit 114 connected to the RAM 115. The ROM 113 is a storage unit that stores the piece of program data to be executed by the CPU 111 and the like. The ROM controller unit 112 is capable of reading out the piece of program data and the like stored in the ROM 113. The RAM 115 is a storage unit that, for example, stores a piece of program data being executed and stores temporary data, such as image data, being executed. The RAM controller unit 114 is capable of reading and writing data from and to the RAM 115.

The CPU 111 is connected further to two interface units 116 and 117 through the main bus 118. The interface units 116 and 117 are responsible for the integrated circuit chip's external communication. In FIG. 1A, the interface unit 117 communicates with the second integrated circuit chip 120 through the interface 150. The main bus 118 is accessible from the CPU 111 and is also accessible from the CPUs of other integrated circuit chips after the interface units 116 and 117 establish communication connections.

A signal amplitude setting terminal 161 and a de-emphasis setting terminal 162 are connected to the interface units 116 and 117. Other settings related to the interface conditions at the interface units 116 and 117 include a pre-emphasis setting, an equalizer setting, and so on (hereinafter referred to collectively as "signal quality settings"). The present embodiment will be described taking the above two signal quality settings as an example.

With the signal amplitude setting terminal 161, an initial value of the magnitude of the signal amplitude at the interface 150 is set according to the input state of the terminal (hereinafter this will be expressed to as "initialized"). The "initial value" here means a setting value at a stage before the CPU starts operating after the integrated circuit chip is released from reset. With the de-emphasis setting terminal 162, whether to enable or disable a de-emphasis function on the signal at the interface 150 is initialized according to the input state of the terminal. From the viewpoint of reducing the terminal cost, the signal amplitude setting terminal 161 and the de-emphasis setting terminal 162 are each a single terminal given per integrated circuit chip. Specifically, an input signal into a common setting terminal is split within the integrated circuit chip to give a common initial setting to registers in the two interface units 116 and 117.

The signal quality settings are collectively set from a control unit on a circuit board on which the integrated circuit chips are mounted. Specifically, the control unit releases each integrated circuit chip from reset, and then configures the settings of the signal amplitude setting terminal and the de-emphasis setting terminal. In each integrated circuit chip, an initial value is set to a register in each interface unit according to the input signal into the corresponding setting terminal.

The interface units 116 and 117 of the first integrated circuit chip 110 are given a common signal amplitude setting and de-emphasis setting. Note that the interface unit 116 is not used and only the interface unit 117 is used. Thus, the input states of the signal amplitude setting terminal 161 and the de-emphasis setting terminal 162 are set to be states that enable proper communication between the interface unit 117 and the second integrated circuit chip 120 through the interface 150 (master-slave communication). Here, the "states that enable proper communication" refer to, for example, states where stable communication can be performed with good signal quality and fewer errors. Specifically, the "states that enable proper communication" refer to states where the signal's AC characteristics, DC characteristics, eye pattern, and so on meet specifications in the interface's communication standard or are sufficient with respect to the specifications.

As an initial setting (first initial value) for the master-slave communication, +Vcc is connected to the signal amplitude setting terminal 161 of the first integrated circuit chip 110, so that the logic of the terminal input becomes high (=1). Accordingly, the signal amplitude is initialized to be full. Also, +Vcc is connected to the de-emphasis setting terminal 162, so that the logic of the terminal input becomes high (=1). Accordingly, the de-emphasis function is initialized to be enabled. Note that the input voltages and input logics of the setting terminals are mere examples, and one or both may be low (=0).

Next, a configuration of the second integrated circuit chip 120 will be described. A CPU 121 is a processing execution unit that executes information processing in accordance with a program. The CPU 121 is connected through a main bus 128 to a ROM controller unit 122 and a RAM controller unit 124 connected to the RAM 125. The ROM controller unit 122 of the second integrated circuit chip 120 has no ROM connected thereto and does not read out a program. The RAM 125 is a storage unit that, for example, stores a piece of program data being executed and stores temporary data, such as image data, being executed. The RAM controller unit 124 is capable of reading and writing data from and to the RAM 125.

The CPU 121 is connected further to two interface units 126 and 127 through the main bus 128. The interface units 126 and 127 are responsible for the integrated circuit chip's external communication. In FIG. 1B, the interface unit 126 communicates with the first integrated circuit chip 110 through the interface 150. The main bus 128 is accessible from the CPU 121 and is also accessible from the CPUs of other integrated circuit chips after the interface units 126 and 127 establish communication connections.

A signal amplitude setting terminal 163 and a de-emphasis setting terminal 164 for signal quality settings are connected to the interface units 126 and 127. With the signal amplitude setting terminal 163, the signal amplitude at the interface 150 is initialized according to the input state of the terminal. With the de-emphasis setting terminal 164, whether to enable or disable a de-emphasis function on the signal at the interface 150 is initialized according to the input state of the terminal. From the viewpoint of reducing the terminal cost, the signal amplitude setting terminal 163 and the de-emphasis setting terminal 164 are each a single terminal given per integrated circuit chip. Specifically, an input signal into a common setting terminal is split within the integrated circuit chip to give a common initial setting to the two interface units 126 and 127.

The signal quality settings are collectively set from a control unit on a circuit board on which the integrated circuit chips are mounted. Specifically, the control unit releases each integrated circuit chip from reset, and then configures the settings of the signal amplitude setting terminal and the de-emphasis setting terminal. In each integrated circuit chip, an initial value is set to a register in each interface unit according to the input signal into the corresponding setting terminal.

The interface units 126 and 127 in the second integrated circuit chip 120 are given a common signal amplitude setting and de-emphasis setting. Note that the interface unit 127 is not used and only the interface unit 126 is used. Thus, the input states of the signal amplitude setting terminal 163 and the de-emphasis setting terminal 164 are set to be states that enable proper communication between the interface unit 126 and the first integrated circuit chip 110 through the interface 150 (master-slave communication). As an initial setting (first initial value) for the master-slave communication, +Vcc is connected to the signal amplitude setting terminal 163 of the second integrated circuit chip 120, so that the logic of the terminal input becomes high (=1). Accordingly, the signal amplitude is initialized to be full. Also, +Vcc is connected to the de-emphasis setting terminal 164, so that the logic of the terminal input becomes high (=1). Accordingly, the de-emphasis function is initialized to be enabled.

With such a configuration, the control unit on the circuit board on which the integrated circuit chips are mounted configures the signal quality settings. In this way, the settings of each interface unit can be brought into a state in advance that enables proper communication. This makes it possible to send a piece of program data from the first integrated circuit chip 110 to the second integrated circuit chip 120 in the proper communication state. As described above, although the two interface units of each integrated circuit chip are given common values as their initial settings, the interface units can be in a state where they can perform proper communication before they start communication. This eliminates the need to provide a setting terminal for initialization for each interface unit of each integrated circuit chip and thus reduces the number of terminals of the integrated circuit chip. Also, only a setting terminal is provided for each individual signal quality setting, and no interface needs to be provided between the chips in a route other than that for the above interface unit. This can reduce the cost of the integrated circuit chips.

As an example in which an interface unit needs initialization as above, Peripheral Component Interconnect Express (PCI-E) has been known. In PCI-E, in a root complex (hereinafter RC) mode, a chip serves as a master to control communication through an interface. On the other hand, in an end point (hereinafter EP) mode, the chip is controlled as a slave. In a case of booting the information processing system, it operates as below according to the mode.

The first integrated circuit chip 110 is set to the first mode (RC mode) to serve as a master. Specifically, at the time of the boot, a mode setting unit not illustrated releases the CPU 111 from reset through the setting terminals of the first integrated circuit chip 110, and selects an address in the ROM 113 as a boot vector address. The second integrated circuit chip 120 is set to the second mode (EP mode) to serve as a slave. Specifically, at the time of the boot, the mode setting unit brings the CPU 121 into a reset state through the setting terminals of the second integrated circuit chip 120, and selects an address in the RAM 125 as a boot vector address.

At the time of the boot, in the first integrated circuit chip 110 in the RC mode, the CPU 111 is released from reset and starts executing a program. The first integrated circuit chip 110 has the initiative on communication control, and starts establishing a connection for communication through the interface 150 as the CPU 111 executes the program. Specifically, the first integrated circuit chip 110 performs operations such as setting the communication speed and configuring settings related to the communication procedure. Here, before the start of communication, the initial settings related to the signal quality at the interface 150 are set based on the configuration in the first embodiment described above. The first integrated circuit chip 110 configures settings for execution of processing by the CPU 121, such as releasing the second integrated circuit chip 120 from reset, setting a base address, and converting addresses.

On the other hand, the second integrated circuit chip 120 in the EP mode is in a state of waiting for settings for executing processing from the first integrated circuit chip 110. After the settings for executing processing are configured, communication is started through the interface 150, so that the first integrated circuit chip 110 sends the piece of program data of the second integrated circuit chip 120 stored in the ROM 113 through the interface 150. After the received piece of program data is stored in the RAM 125, an address in the RAM 125 is set as a boot vector address. The CPU 121 gets released from reset and executes the program. As a result, the second integrated circuit chip 120 starts operating.

Second Embodiment

Figure 2A:
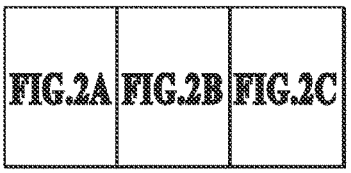
FIGS. 2A, 2B and 2C are block diagrams illustrating an example configuration of an information processing system in a second embodiment.
Figure 2A:
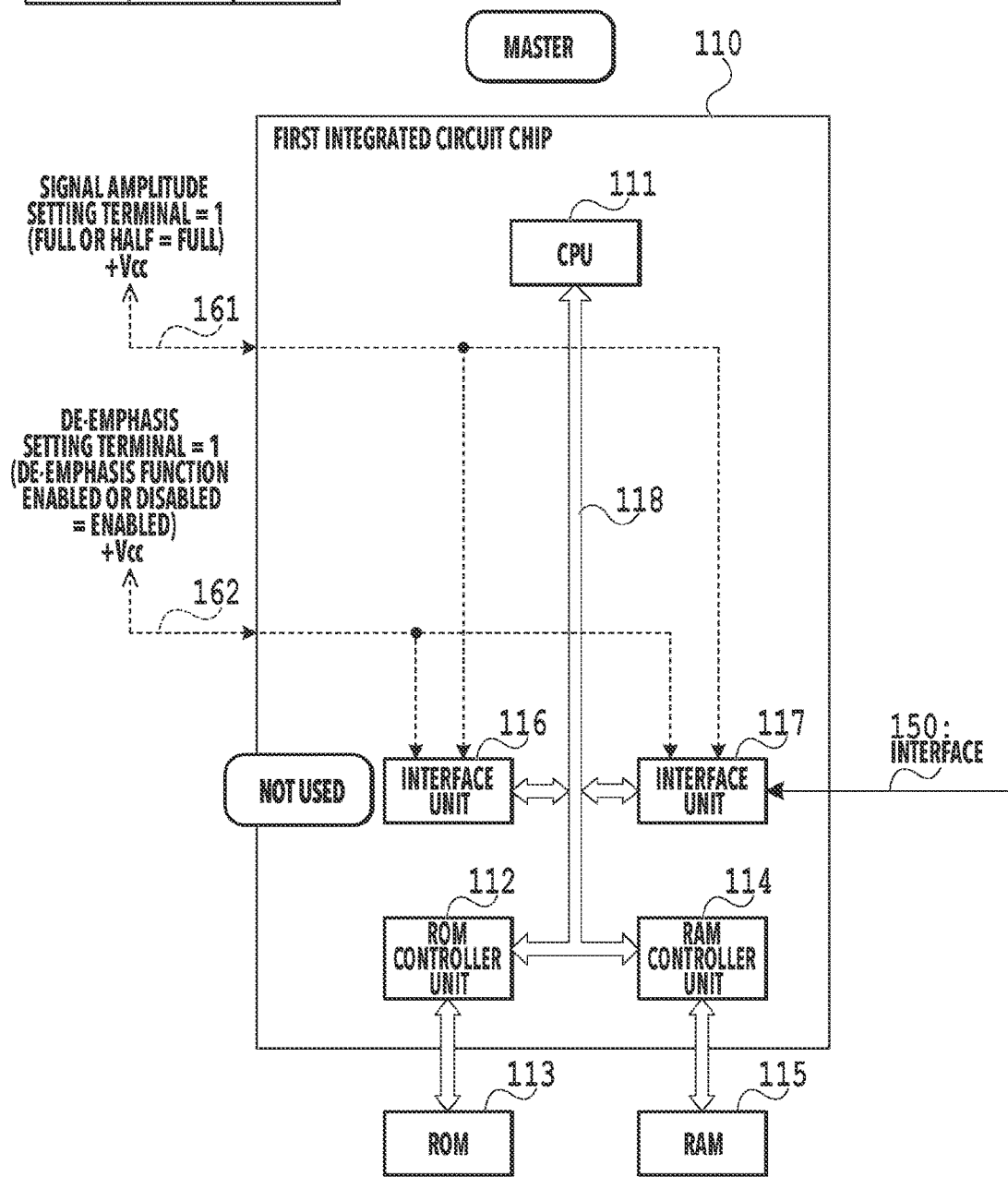
Figure 2B:
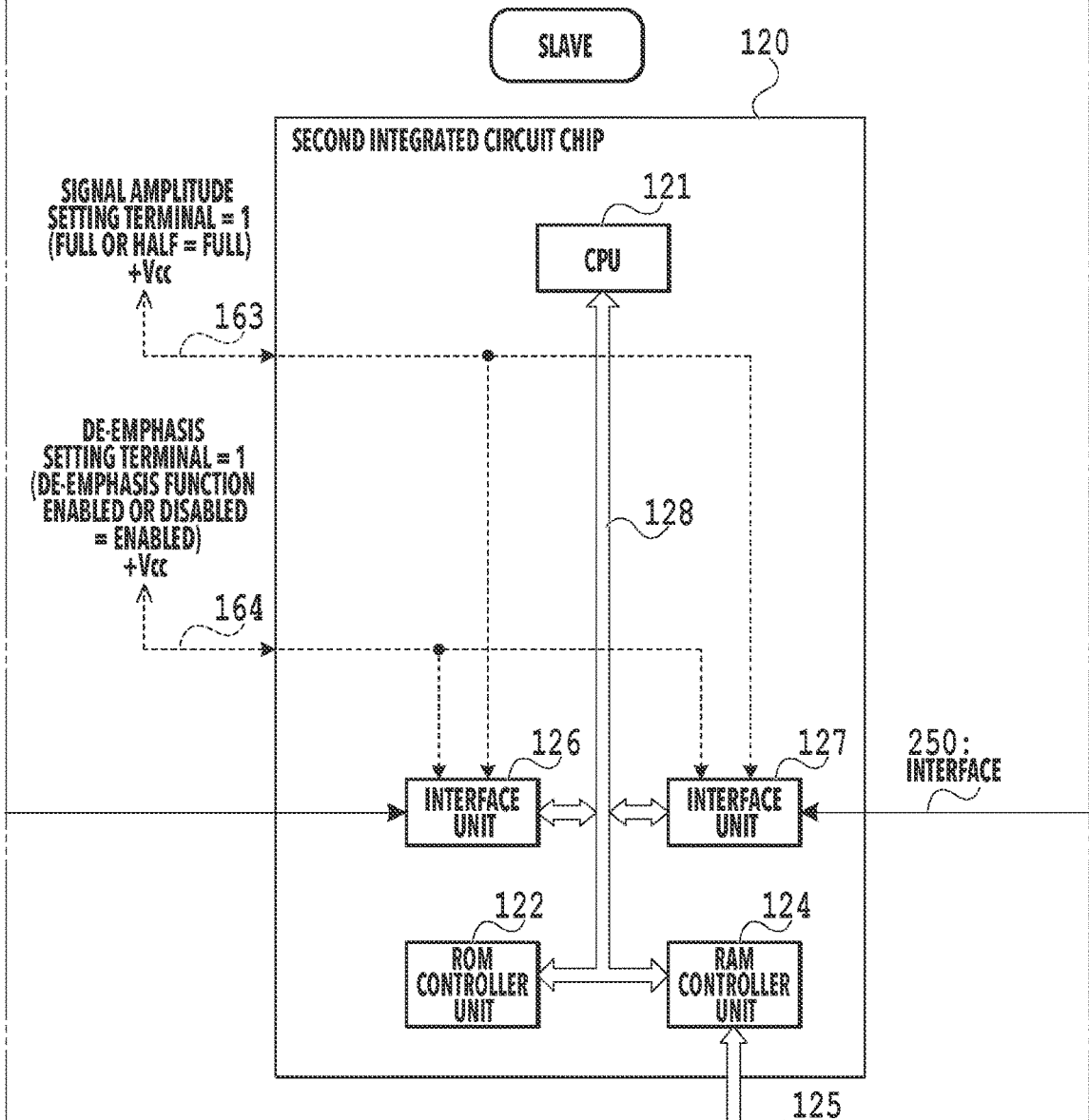
Figure 2C:
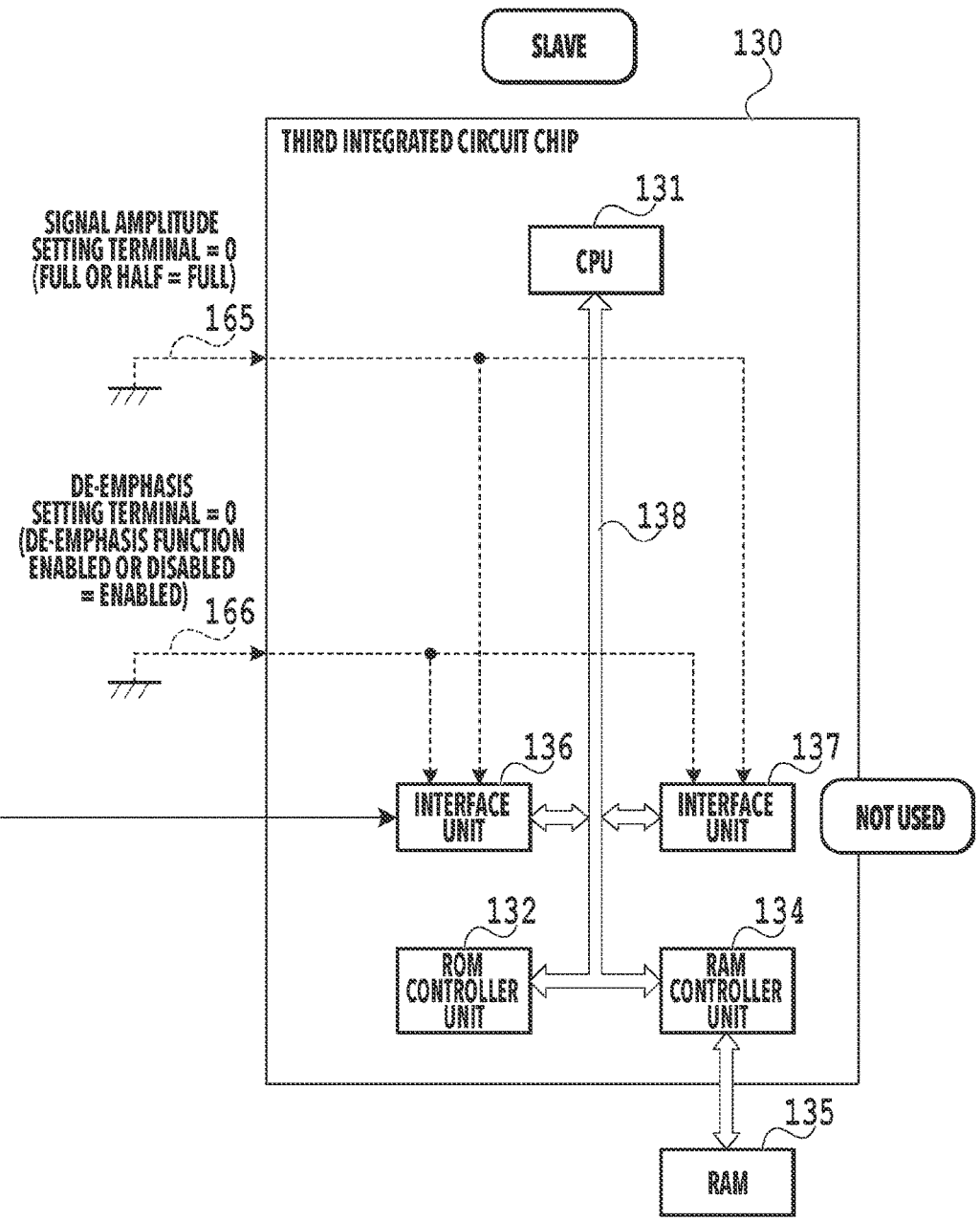

FIGS. 2A, 2B and 2C are block diagrams illustrating an example configuration of an information processing system with a 3-chip configuration using a plurality of slave chips in a second embodiment. The information processing system includes the first integrated circuit chip 110 and the second integrated circuit chip 120 in the first embodiment and additionally a third integrated circuit chip 130. The ROM 113 and the RAM 115 are connected to the first integrated circuit chip 110. To reduce the number of parts for cost reduction, no ROM is connected to the second integrated circuit chip 120 or the third integrated circuit chip 130, and only the RAM 125 and a RAM 135 are connected to them, respectively. The second integrated circuit chip 120 and the third integrated circuit chip 130 are connected through an interface 250 for performing communication.

The first integrated circuit chip 110, the second integrated circuit chip 120, and the third integrated circuit chip 130 are integrated circuit chips having the same internal configuration with different memories connected thereto. On the other hand, the first integrated circuit chip 110 is an integrated circuit chip that operates in a first mode to serve as a master whereas the second integrated circuit chip 120 and the third integrated circuit chip 130 is an integrated circuit chip that operates in a second mode to serve as a slave.

The ROM 113 of the first integrated circuit chip 110 stores pieces of program data for causing the integrated circuit chips to operate. The first integrated circuit chip 110 sends the piece of program data of the second integrated circuit chip 120 stored in the ROM 113 through the interface 150. Moreover, the first integrated circuit chip 110 sends the piece of program data of the third integrated circuit chip 130 stored in the ROM 113 through the interfaces 150 and 250. The second integrated circuit chip 120 and the third integrated circuit chip 130, in turn, store the received pieces of program data in the respective RAMs. After that, the second integrated circuit chip 120 and the third integrated circuit chip 130 operate in accordance with these pieces of program data.

Next, a configuration of the third integrated circuit chip 130 will be described. A CPU 131 is a processing execution unit that executes information processing in accordance with a program. The CPU 131 is connected through a main bus 138 to a ROM controller unit 132 and a RAM controller unit 134 connected to the RAM 135. The ROM controller unit 132 of the third integrated circuit chip 130 has no ROM connected thereto and does not read out a program. The RAM 135 is a storage unit that, for example, stores a piece of program data being executed and stores temporary data, such as image data, being executed. The RAM controller unit 134 is capable of reading and writing data from and to the RAM 135.

The CPU 131 is connected further to two interface units 136 and 137 through the main bus 138. The interface units 136 and 137 are responsible for the integrated circuit chip's external communication. In FIG. 2C, the interface unit 136 communicates with the second integrated circuit chip 120 through the interface 250. The main bus 138 is accessible from the CPU 131 and is also accessible from the CPUs of other integrated circuit chips after the interface units 136 and 137 establish communication connections.

A signal amplitude setting terminal 165 and a de-emphasis setting terminal 166 for signal quality settings are connected to the interface units 136 and 137. With the signal amplitude setting terminal 165, the signal amplitude at the interface 250 is initialized according to the input state of the terminal. With the de-emphasis setting terminal 166, whether to enable or disable a de-emphasis function on the signal at the interface 250 is initialized according to the input state of the terminal. From the viewpoint of reducing the terminal cost, the signal amplitude setting terminal 165 and the de-emphasis setting terminal 166 are each a single terminal given per integrated circuit chip. Specifically, an input signal into a common setting terminal is split within the integrated circuit chip to give a common initial setting to registers in the two interface units 136 and 137.

The signal quality settings are collectively set from a control unit on a circuit board on which the integrated circuit chips are mounted. Specifically, the control unit releases each integrated circuit chip from reset, and then configures the settings of the signal amplitude setting terminal and the de-emphasis setting terminal. In each integrated circuit chip, an initial value is set to a register in each interface unit according to the input signal into the corresponding setting terminal.

The interface units 136 and 137 in the third integrated circuit chip 130 are given a common signal amplitude setting and de-emphasis setting. Note that the interface unit 137 is not used and only the interface unit 136 is used. Thus, the input states of the signal amplitude setting terminal 165 and the de-emphasis setting terminal 166 are set to be states that enable proper communication between the interface unit 136 and the second integrated circuit chip 120 serving as a slave through the interface 250 (inter-slave communication). As an initial setting (second initial value) for the inter-slave communication, GND is connected to the signal amplitude setting terminal 165 of the third integrated circuit chip 130, so that the logic of the terminal input becomes low (=0). Accordingly, the signal amplitude is initialized to be half. Also, GND is connected to the de-emphasis setting terminal 166, so that the logic of the terminal input becomes low (=0). Accordingly, the de-emphasis function is initialized to be disabled.

In the second embodiment, a 3-chip configuration is employed. Thus, the interface unit 127 of the second integrated circuit chip 120, which is not used in the first embodiment, is used for communication with the third integrated circuit chip 130. The signal amplitude setting terminal 163 and the de-emphasis setting terminal 164 of the second integrated circuit chip 120 are each given a common initial setting for the interface units 126 and 127. Thus, a logic that enables proper communication with the first integrated circuit chip 110, which is the master, through the interface 150 (master-slave communication), i.e., the first initial value, is set. Note that this logic is not necessarily a logic that enables proper communication through the interface 250. The logic that enables proper communication may be different between the interfaces 150 and 250 due to differences in the layout on the circuit board and the conditions of wirings and the like.

Since communication through the interface 150 has already been established, the CPU 111 rewrites the values of the signal amplitude setting and de-emphasis setting registers in the interface unit 127 through the interface 150. Specifically, a method in which the values of the registers in the interface unit 127 are rewritten to proper setting values for the interface 250 is conceivable. A method also is conceivable in which, if the CPU 121 is ready to operate, the CPU 121 rewrites the values of the signal amplitude setting and de-emphasis setting registers in the interface unit 127 through the main bus 128 to proper setting values for the interface 250.

Figure 3:
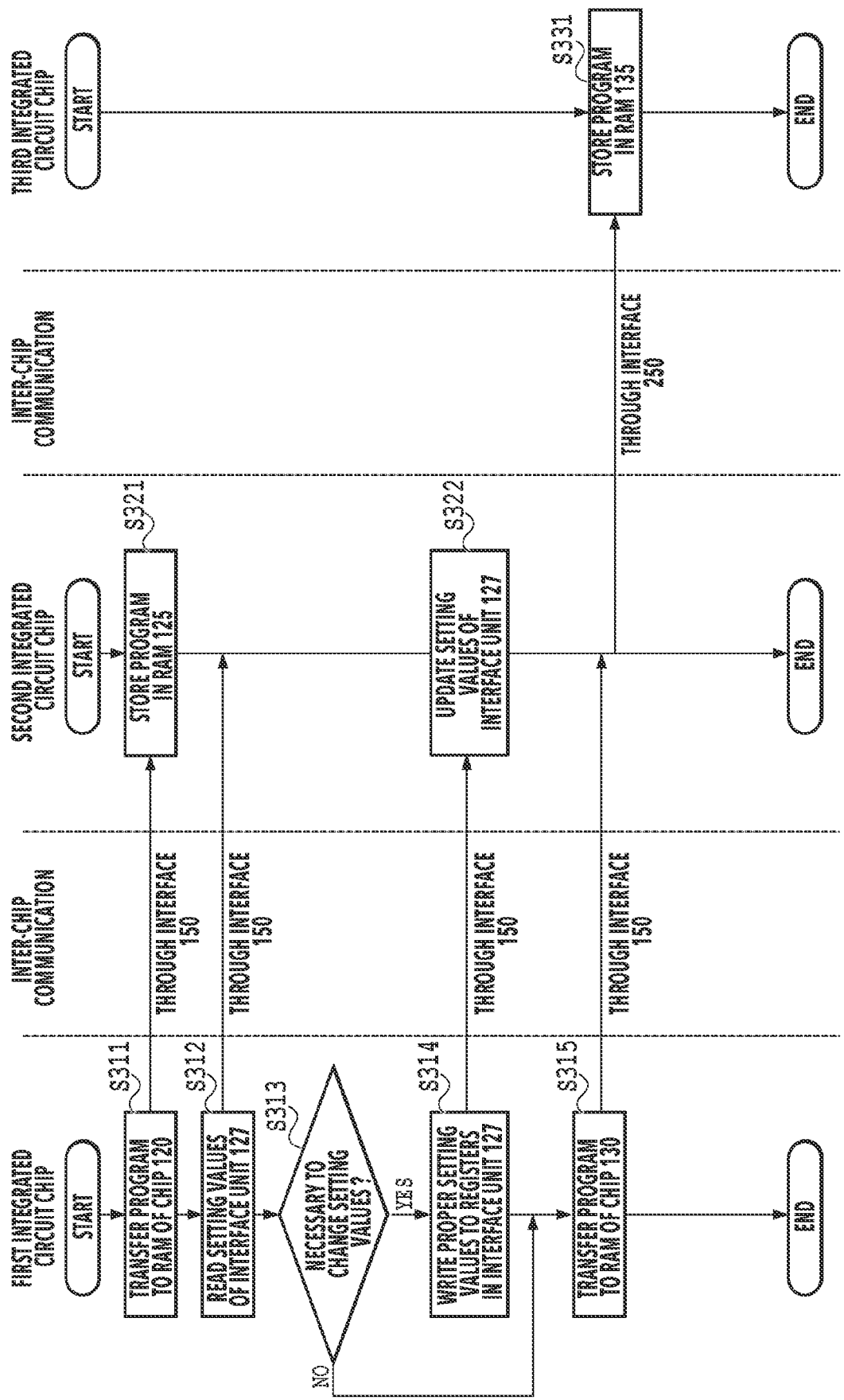
FIG. 3 is an example flowchart of a method of controlling the information processing system in the second embodiment.

FIG. 3 illustrates an example flow of control performed in a case where the CPU 111 rewrites the values of the signal amplitude setting and de-emphasis setting registers in the interface unit 127 through the interface 150. The control unit on the circuit board on which the integrated circuit chips are mounted releases each integrated circuit chip from reset. Thereafter, the CPU 111 of the first integrated circuit chip 110 is booted. With the mode setting unit not illustrated, the CPU 111 recognizes that it is the CPU of an integrated circuit chip in the first mode serving as a master. Moreover, a point when initial values are set to the registers in the interface units of each integrated circuit chip and communication through the interface 150 (master-slave communication) is established is set as a start point. Note that the symbols "S" in the following description represent steps.

In S311, the CPU 111 of the first integrated circuit chip 110 sends the piece of program data of the second integrated circuit chip 120 to the RAM 125 through the interface 150. The second integrated circuit chip 120 receives the piece of program data through the interface 150 and stores it in the RAM 125 (S321).

In S312, the CPU 111 of the first integrated circuit chip 110 reads the setting values of the signal amplitude setting and de-emphasis setting registers in the interface unit 127 of the second integrated circuit chip 120 through the interface 150.

In S313, the CPU 111 of the first integrated circuit chip 110 determines whether it is necessary to change the read setting values. Here, the interface units 126 and 127 are set to logics (first initial value) that enable proper communication with the first integrated circuit chip 110, which is the master, through the interface 150 (master-slave communication), as, the common initial setting. Specifically, the signal amplitude is initialized to be full through the signal amplitude setting terminal 163 of the second integrated circuit chip 120, and the de-emphasis function is initialized to be enabled through the de-emphasis setting terminal 164.

On the other hand, the interface unit 127 is used for communication with the third integrated circuit chip 130 serving as a slave through the interface 250 (inter-slave communication). As mentioned above, for the third integrated circuit chip 130, the signal amplitude is initialized to be half through the signal amplitude setting terminal 165, and the de-emphasis function is initialized to be disabled through the de-emphasis setting terminal 166. The CPU 111 therefore determines that it is necessary to change the setting values of the interface unit 127 to logics (second initial value) which enable proper communication with the third integrated circuit chip 130 serving as a slave (inter-slave communication).

If it is determined in S313 that it is necessary to change the setting values, the processing proceeds to S314. The CPU 111 of the first integrated circuit chip 110 writes the proper setting values to the signal amplitude setting and de-emphasis setting registers in the interface unit 127 the through the interface 150. Specifically, the signal amplitude setting of the interface unit 127 is updated to be half, and the de-emphasis setting is updated to be disabled (S322).

Then, in S315, the logics are such that proper communication can be performed through the interface 250. The CPU 111 of the first integrated circuit chip 110 sends the piece of program data of the third integrated circuit chip 130 to the RAM 135 through the interfaces 150 and 250. The third integrated circuit chip 130 receives the piece of program data through the interface 250 and stores it in the RAM 135 (S331).

Figure 4:
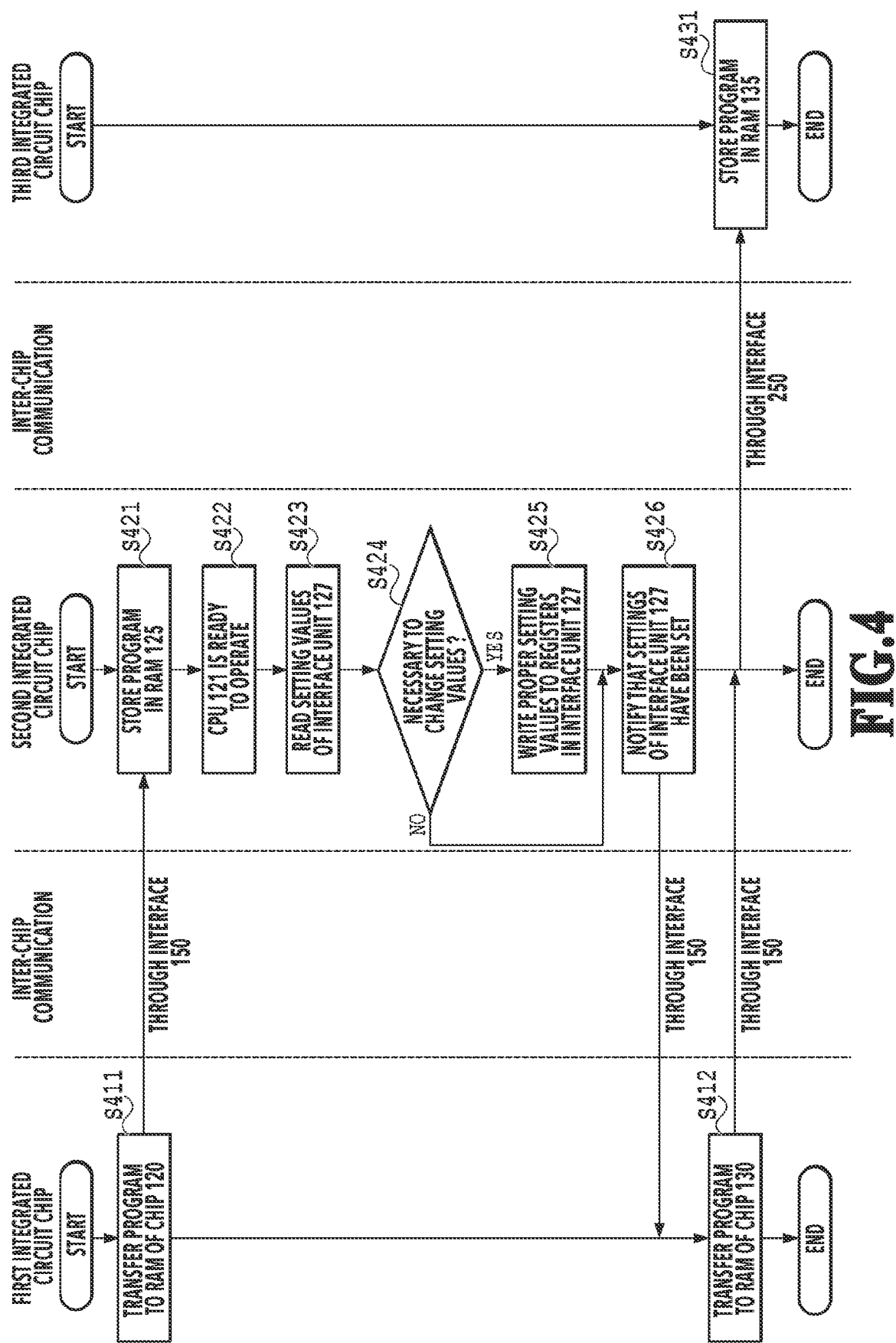
FIG. 4 is an example flowchart of a method of controlling the information processing system in the second embodiment.

FIG. 4 illustrates an example flow of control performed in a case where the CPU 121 rewrites the values of the signal amplitude setting and de-emphasis setting registers in the interface unit 127. The control unit on the circuit board on which the integrated circuit chips are mounted releases each integrated circuit chip from reset. Thereafter, the CPU 111 of the first integrated circuit chip 110 is booted. With the mode setting unit not illustrated, the CPU 111 recognizes that it is the CPU of an integrated circuit chip in the first mode serving as a master. Moreover, a point when initial values are set to the registers in the interface units of each integrated circuit chip and communication through the interface 150 (master-slave communication) is established is set as a start point.

In S411, the CPU 111 of the first integrated circuit chip 110 sends the piece of program data of the second integrated circuit chip 120 to the RAM 125 through the interface 150. The second integrated circuit chip 120 receives the piece of program data through the interface 150 and stores it in the RAM 125 (S421).

In S422, the CPU 121 of the second integrated circuit chip 120 is released from reset. The CPU 121 is now ready to operate.

In S423, the CPU 121 of the second integrated circuit chip 120 reads the setting values of the signal amplitude setting and de-emphasis setting registers in the interface unit 127 through the main bus 128.

In S424, the CPU 121 of the second integrated circuit chip 120 determines whether it is necessary to change the read setting values. Here, as in the control flow illustrated in FIG. 3, the CPU 121 determines that it is necessary to change the setting values of the interface unit 127 to logics (second initial value) which enable proper communication through the interface 250 (inter-slave communication).

If it is determined in S424 that it is necessary to change the setting values, the processing proceeds to S425. The CPU 121 of the second integrated circuit chip 120 writes the proper setting values to the signal amplitude setting and de-emphasis setting registers in the interface unit 127 the through the main bus 128.

In S426, the CPU 121 of the second integrated circuit chip 120 notifies the CPU 111 of the first integrated circuit chip 110 that the setting values of the signal amplitude setting and de-emphasis setting registers in the interface unit 127 are now proper values.

Then, in S412, the logics are such that proper communication can be performed through the interface 250. The CPU 111 of the first integrated circuit chip 110 sends the piece of program data of the third integrated circuit chip 130 to the RAM 135 through the interfaces 150 and 250. The third integrated circuit chip 130 receives the piece of program data through the interface 250 and stores it in the RAM 135 (S431).

With such a configuration, the settings of each interface unit can be brought into a state in advance that enables proper communication. This makes it possible to send a piece of program data from the first integrated circuit chip 110 to the second integrated circuit chip 120 and a piece of program data from the first integrated circuit chip 110 to the third integrated circuit chip 130 in the proper communication state. As described above, although the two interface units of each integrated circuit chip are given common values as their initial settings, the interface units can be in a state where they can perform proper communication before they start communication. This eliminates the need to provide a setting terminal for initialization for each interface unit of each integrated circuit chip and thus reduces the number of terminals of the integrated circuit chip. Also, only a setting terminal is provided for each individual signal quality setting, and no interface needs to be provided between the chips in a route other than those for the above interface units. This can reduce the cost of the integrated circuit chips.

Third Embodiment

A third embodiment is the same as the second embodiment in that a 3-chip configuration with a plurality of slave chips is used, but is different in that the second integrated circuit chip 120 and the third integrated circuit chip 130 are connected through an interface cable.

Figure 5A:
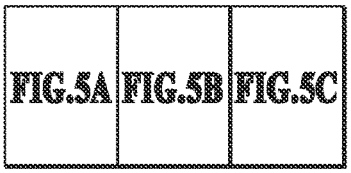
FIGS. 5A, 5B and 5C are block diagrams illustrating an example configuration of an information processing system in a third embodiment.
Figure 5A:
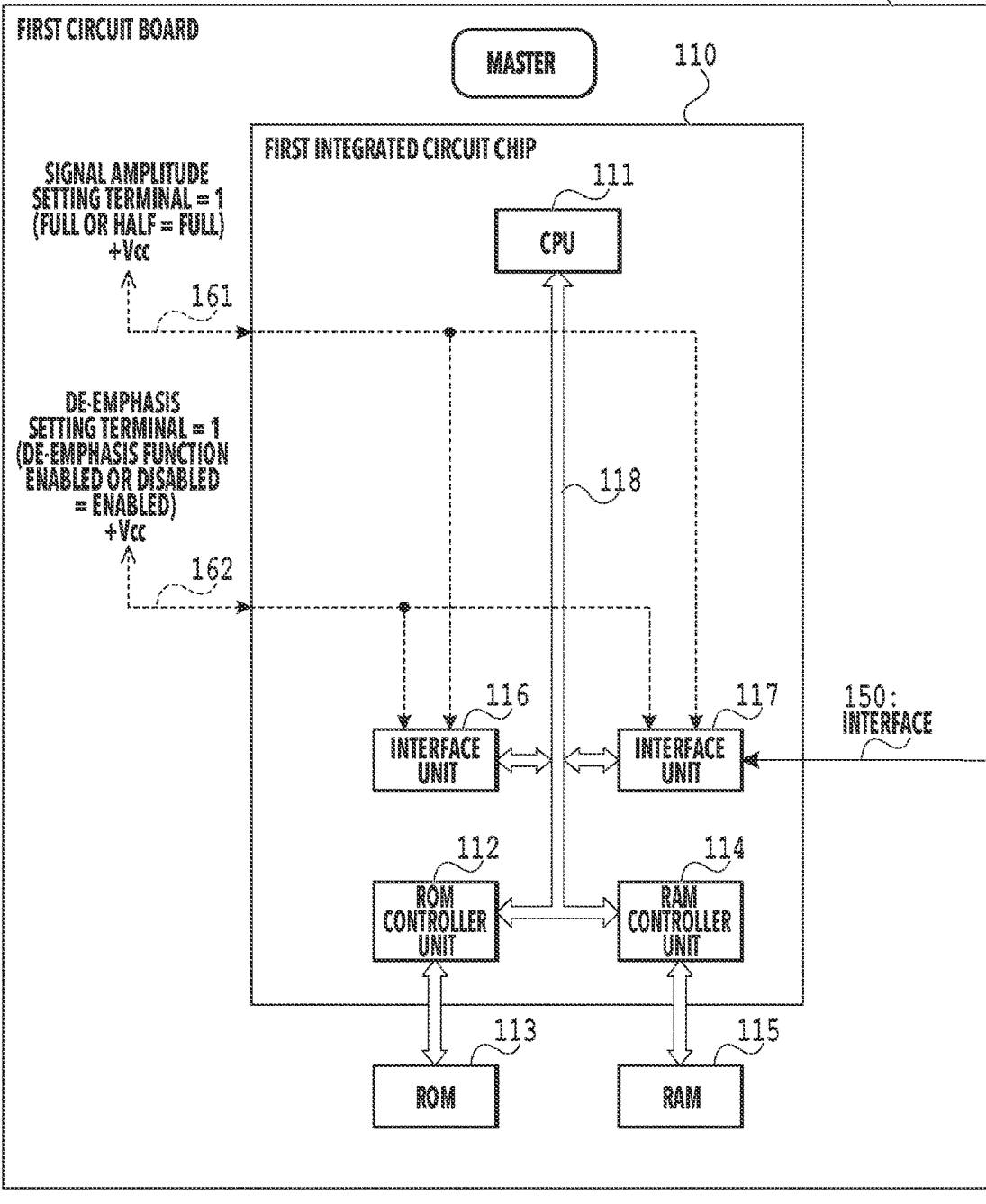
Figure 5B:
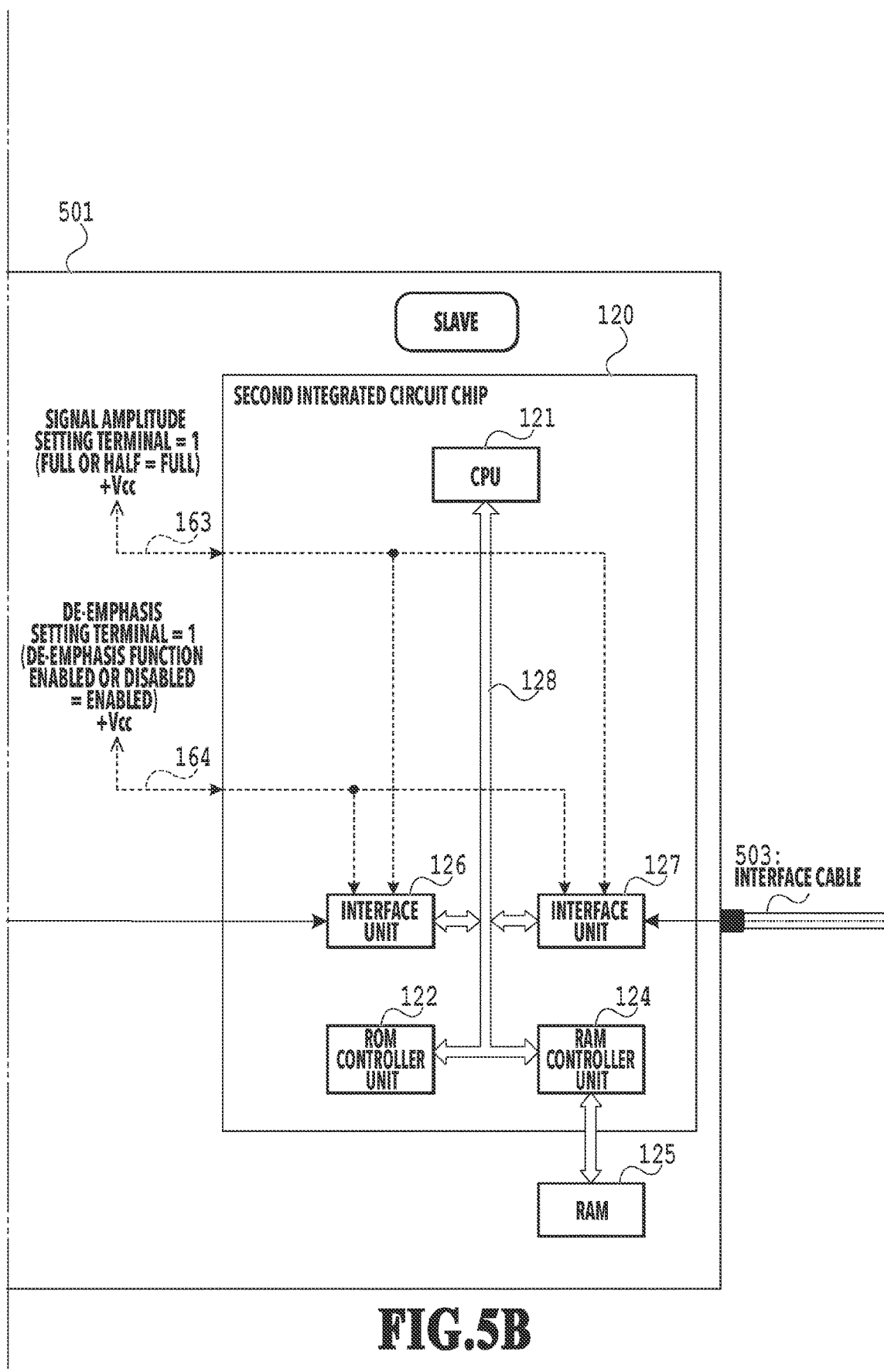
Figure 5C:
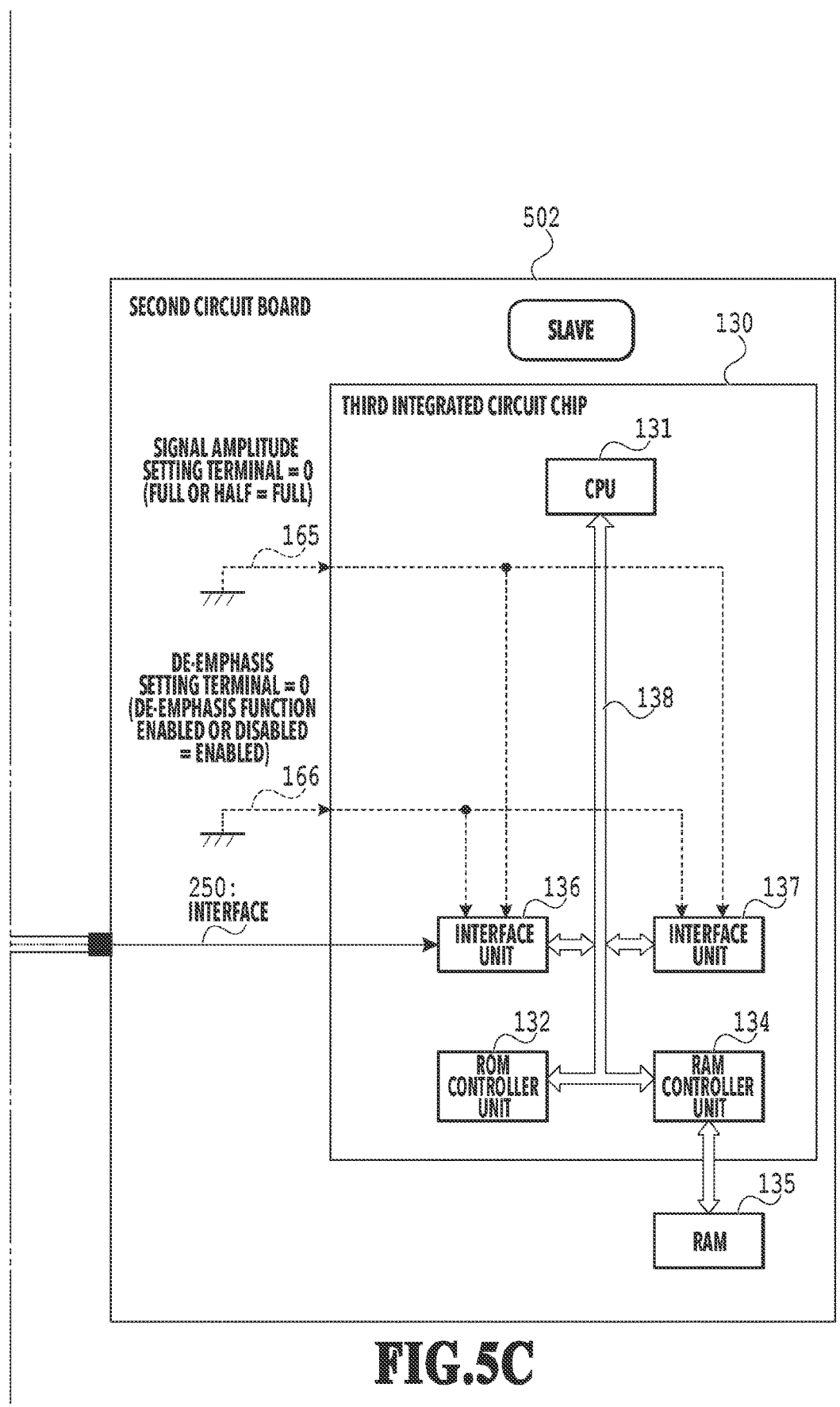

FIGS. 5A, 5B and 5C are block diagrams illustrating an example configuration of an information processing system in the third embodiment in which integrated circuit chips are connected through an interface cable. The same portions as those in the second embodiment are denoted by the same reference signs, and description thereof is omitted. The third embodiment differs from the second embodiment is that the first integrated circuit chip 110 and the second integrated circuit chip 120 are mounted on a first circuit board 501 and the third integrated circuit chip 130 is mounted on a second circuit board 502. Thus, the second integrated circuit chip 120 on the first circuit board 501 and the third integrated circuit chip 130 on the second circuit board 502 are connected by an interface cable 503. The interface cable 503 accommodates therein wirings of the interface 250 between the interface unit 127 of the second integrated circuit chip 120 and the interface unit 136 of the third integrated circuit chip 130.

The control flow is the same as the control flow presented in the second embodiment.

In the case of a configuration as described above in which different circuit boards are connected through an interface cable, the interface conditions are different from those in the case where the integrated circuit chips are wired on the same circuit board. Also, the communication path between the integrated circuit chips is longer in distance, which makes communication more easily affected by an impedance mismatch and the like. In particular, in a case where the interface cable is installed in a movable portion, changes in the interface conditions have a significant impact. Thus, even for inter-slave communication through the same interface 250, the signal quality settings such as the signal amplitude setting and the de-emphasis setting are each set to a plurality of setting values corresponding to the interface conditions. According to the control flow presented in the second embodiment, the setting values of the interface units of the integrated circuit chips can be updated in advance such that proper communication can be performed between the interface units.

In the first and second embodiments, the setting values of the initial settings are different between master-slave communication and inter-slave communication. According to the present disclosure, it is possible to set desired setting values by, for example, changing the setting values according to whether communication is to be performed within a circuit board or between circuit boards, as in the third embodiment, or changing the setting values according to the type of communication through the interface or the type of the communication path. According to the present disclosure, it is possible not only to reduce the number of terminals of integrated circuit chips to reduce the cost of the integrated circuit chips, but also to achieve stable communication quality between the integrated circuit chips.

Fourth Embodiment

Figure 6A:
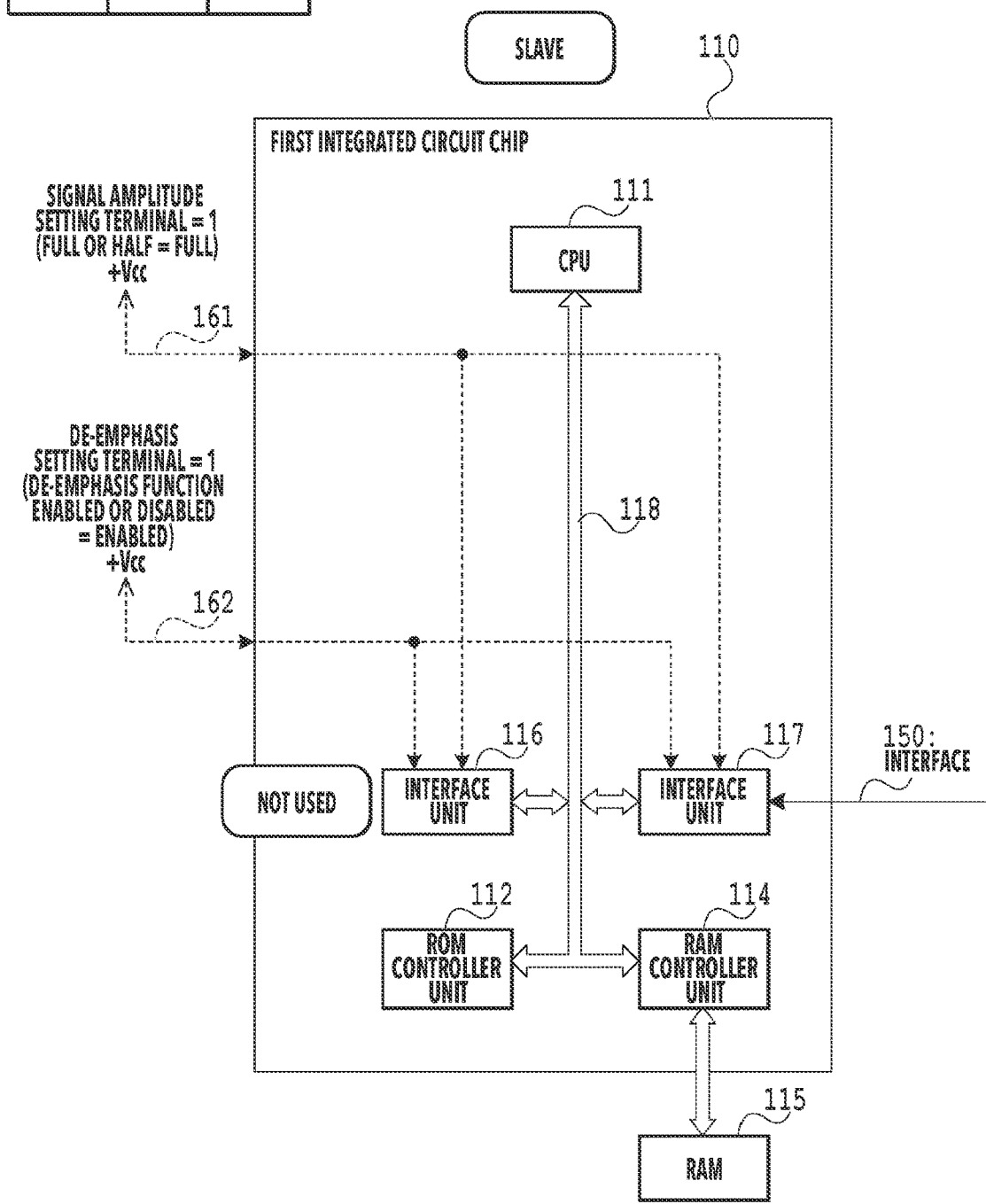
FIGS. 6A, 6B and 6C are block diagrams illustrating an example configuration of an information processing system in a fourth embodiment.
Figure 6B:
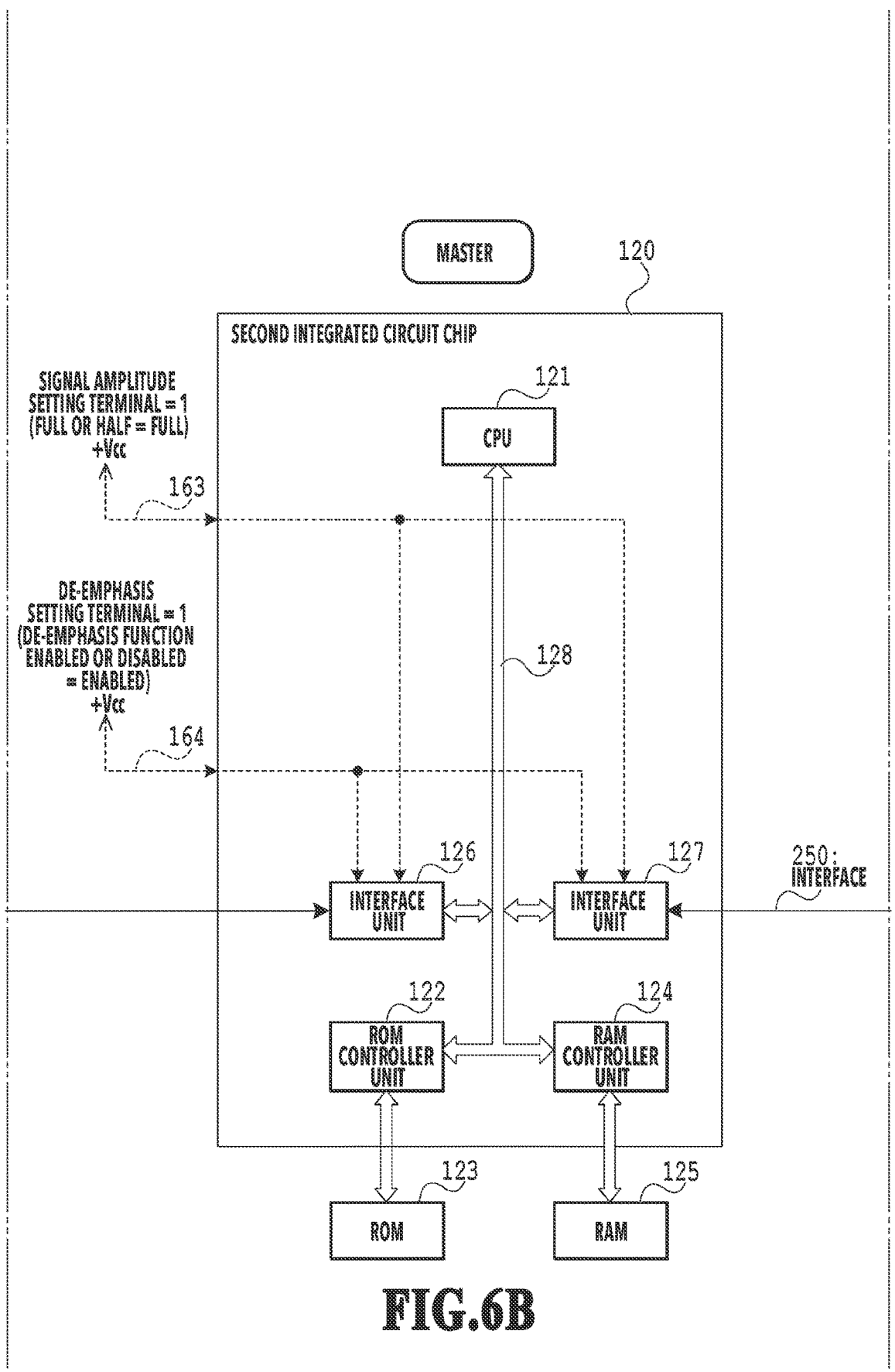
Figure 6C:
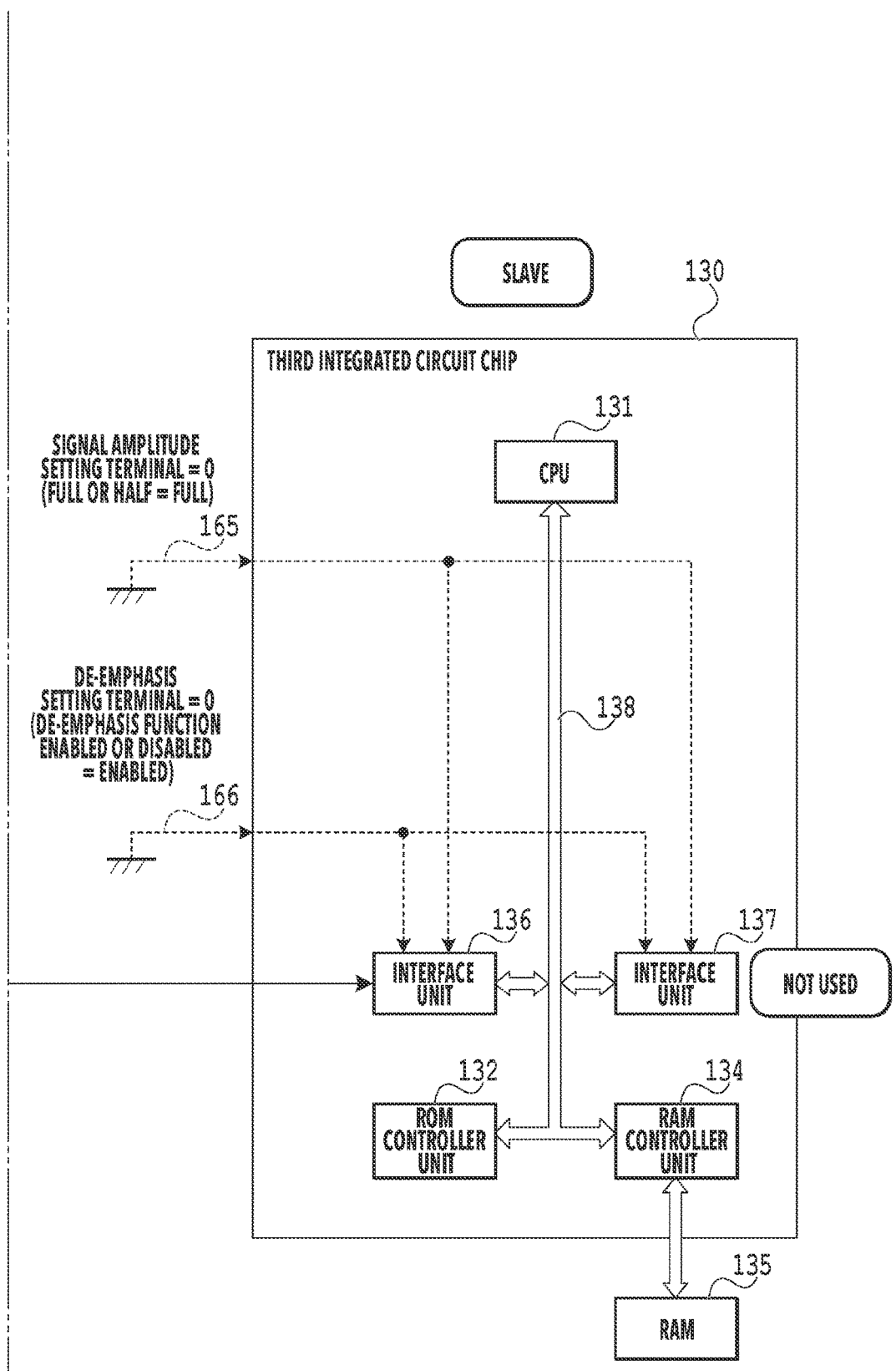

FIGS. 6A, 6B and 6C are block diagrams illustrating an example configuration of an information processing system with a 3-chip configuration using a plurality of slave chips in a fourth embodiment. The fourth embodiment differs from the second embodiment in that the second integrated circuit chip 120 operates in the first mode to serve as a master, and the first integrated circuit chip 110 and the third integrated circuit chip 130 operate in the second mode to serve as slaves. The second integrated circuit chip 120 serving as the master uses a plurality of interface units. The same portions as those in the second embodiment are denoted by the same reference signs, and description thereof is omitted. Thus, a ROM 123 is connected to the ROM controller unit 122 of the second integrated circuit chip 120. On the other hand, no ROM is connected to the first integrated circuit chip 110 or the third integrated circuit chip 130 in order to reduce the number of parts for cost reduction.

The ROM 123 of the second integrated circuit chip 120 stores pieces of program data for causing the integrated circuit chips to operate. The second integrated circuit chip 120 sends the piece of program data of the first integrated circuit chip 110 stored in the ROM 123 through the interface 150. Moreover, the second integrated circuit chip 120 sends the piece of program data of the third integrated circuit chip 130 stored in the ROM 123 through the interface 250. The first integrated circuit chip 110 and the third integrated circuit chip 130, in turn, store the received pieces of program data in the respective RAMs. After that, the first integrated circuit chip 110 and the third integrated circuit chip 130 operate in accordance with these pieces of program data.

A signal amplitude setting terminal 163 and a de-emphasis setting terminal 164 for signal quality settings are connected to the interface units 126 and 127 in the second integrated circuit chip 120. With the signal amplitude setting terminal 163, initial values of the magnitude of the signal amplitude at the interfaces 150 and 250 is initialized according to the input state of the terminal. With the de-emphasis setting terminal 164, whether to enable or disable a de-emphasis function on the signals at the interfaces 150 and 250 is initialized according to the input state of the terminal.

The signal quality settings are collectively set from a control unit on a circuit board on which the integrated circuit chips are mounted. Specifically, the control unit releases each integrated circuit chip from reset, and then configures the settings of the signal amplitude setting terminal and the de-emphasis setting terminal. In each integrated circuit chip, an initial value is set to a register in each interface unit according to the input signal into the corresponding setting terminal.

The interface units 126 and 127 in the second integrated circuit chip 120 are given a common signal amplitude setting and de-emphasis setting. In the fourth embodiment, both of the interface units 126 and 127 are used. Thus, the input states of the signal amplitude setting terminal 163 and the de-emphasis setting terminal 164 are set to be states which enable one of the interface units 126 and 127 to perform proper communication. The interface unit to be brought into the state of being capable of performing proper communication may be determined, for example, based on a preset order of program transfer such that the interface unit to be connected to the first integrated circuit chip to transfer a program is selected.

Here, the input states of the signal amplitude setting terminal 163 and the de-emphasis setting terminal 164 are set to be states which enable proper communication with the interface unit 117 of the first integrated circuit chip 110 through the interface 150 (master-slave communication). As an initial setting (first initial value) for the master-slave communication, +Vcc is connected to the signal amplitude setting terminal 163 of the second integrated circuit chip 120, so that the logic of the terminal input becomes high (=1). Accordingly, the signal amplitude is initialized to be full. Also, +Vcc is connected to the de-emphasis setting terminal 164, so that the logic of the terminal input becomes high (=1). Accordingly, the de-emphasis function is initialized to be enabled. Note that the settings may be different if the interface unit 126 is in a state of being capable of performing proper communication.

With the above settings, the logics may not necessarily enable the interface unit 127 to perform proper communication. Thus, as in the second embodiment, the CPU 121 is required to update the setting values of the signal amplitude setting and de-emphasis setting registers in the interface unit 127 through the main bus 128. Here, the setting values are updated to the second initial value so that proper communication can be performed with the third integrated circuit chip 130 serving as a slave through the interface 250 (master-slave communication).

With such a configuration, the settings of each interface unit can be brought into a state in advance that enables proper communication. This makes it possible to send a piece of program data from the second integrated circuit chip 120 to the first integrated circuit chip 110 and a piece of program data from the second integrated circuit chip 120 to the third integrated circuit chip 130 in the proper communication state. As described above, although the two interface units of each integrated circuit chip are given common values as their initial settings, the interface units can be in a state where they can perform proper communication before they start communication. This eliminates the need to provide a setting terminal for initialization for each interface unit of each integrated circuit chip and thus reduces the number of terminals of the integrated circuit chip. Also, only a setting terminal is provided for each individual signal quality setting, and no interface needs to be provided between the chips in a route other than those for the above interface units. This can reduce the cost of the integrated circuit chips.

In the first to fourth embodiments, configurations including two interface units in each single integrated circuit chip have been exemplarily described. Even in a case where each single integrated circuit chip includes three or more interface units, it is only necessary to set the signal quality settings of the signal amplitude setting terminal, the de-emphasis setting terminal, and so on in common to all interface units. It suffices that the integrated circuit chip serving as the master uses one of the plurality of interface units as an interface unit for transferring program data, and configure settings such that this one interface unit can perform proper communication (master-slave communication). The effect of reducing the number of terminals is expected to be greater the larger the number of interface units.

Fifth Embodiment

Figure 7:
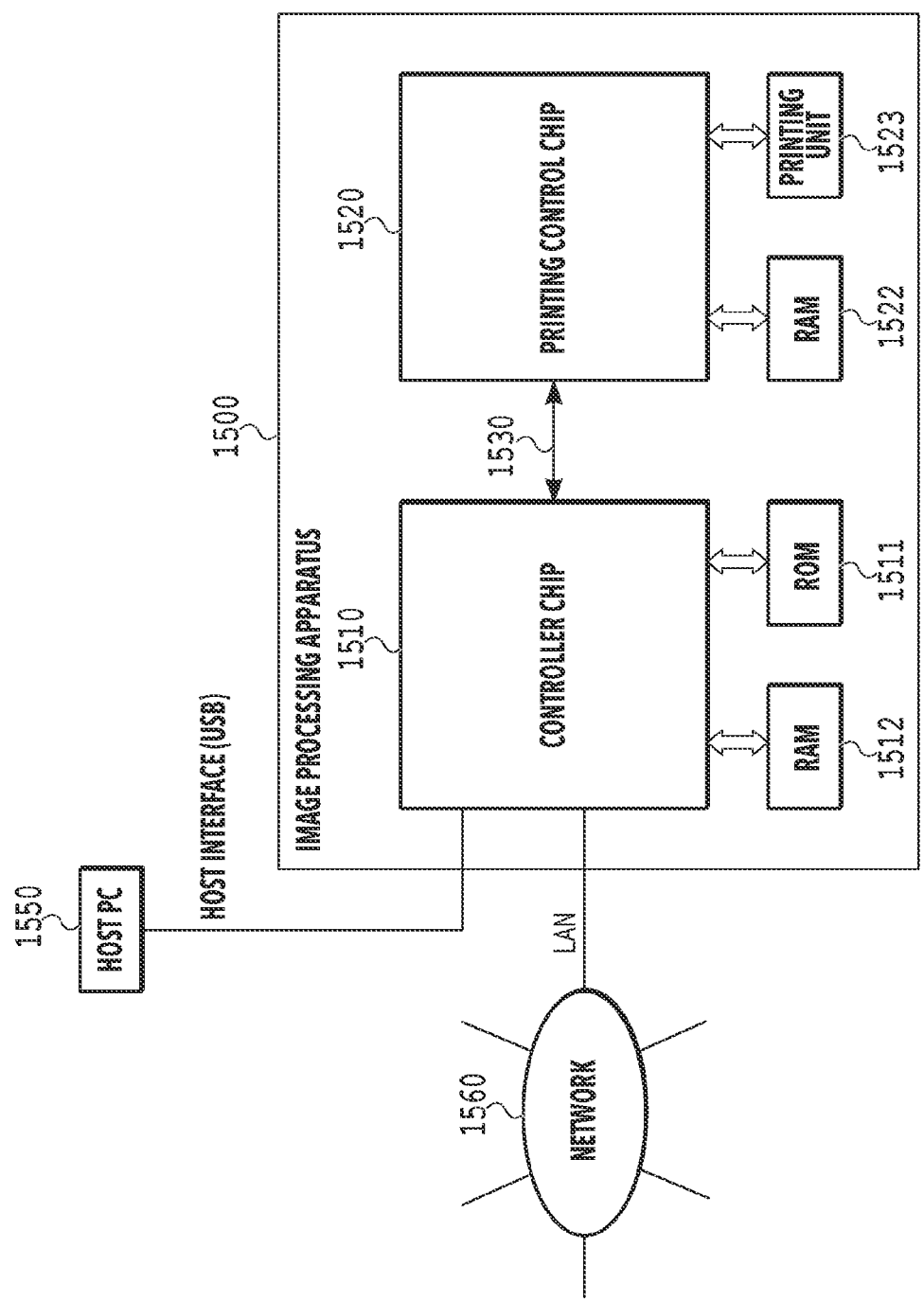
FIG. 7 is a block diagram illustrating an example configuration of an image processing apparatus in a fifth embodiment.

FIG. 7 illustrates an example configuration of an image processing apparatus in a fifth embodiment. An image processing apparatus 1500 includes a controller chip 1510 and a printing control chip 1520 as integrated circuit chips. A ROM 1511 and a RAM 1512 are connected to the controller chip 1510. No ROM is connected to the printing control chip 1520, and only a RAM 1522 is connected to it. The controller chip 1510 and the printing control chip 1520 are connected through an interface 1530 for performing communication.

Also, the controller chip 1510 is connected through a host interface to a host PC 1550 that sends print jobs and the like, and is connected through a LAN to an external network 1560. A printing unit 1523 that performs head and paper conveyance and so on is connected to the printing control chip 1520.

The controller chip 1510 serves as the first integrated circuit chip 110 in the first to fourth embodiments, and the printing control chip 1520 serves as the second integrated circuit chip 120 in the first to fourth embodiments. In a case where the image processing apparatus 1500 further includes a different printing control chip or an integrated circuit chip with another function, it serves as the third integrated circuit chip 130. Applying the configurations in the first to fourth embodiments as above can reduce the number of terminals of the integrated circuit chips, which can in turn reduce the cost of the integrated circuit chips and the cost of the image processing apparatus 1500.

Other Embodiment

Note that the information processing systems are not limited to image processing apparatuses. The configurations according to the present disclosure are applicable to, for example, information processing apparatuses such as personal computers, industrial equipment, and so on if they are apparatuses including a plurality of integrated circuit chips.

In the present disclosure, integrated circuit chips with the same configuration are used as a master and a slave(s). However, the present disclosure is not limited to this configuration. Specifically, the configurations according to the present disclosure are applicable systems with integrated circuit chips that can be selected and configured as a master and a slave by an information processing system, if the integrated circuit chips include a plurality of interface units.

According to the present disclosure, an information processing system including a plurality of integrated circuit chips can use fewer terminals to set initial settings of communication units for communication between the integrated circuit chips. This can reduce the cost of the integrated circuit chips.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-183410, filed Nov. 10, 2021 which is hereby incorporated by reference wherein in its entirety.

What is claimed is:

1. An information processing system comprising:
a plurality of integrated circuit chips each including
a processing execution unit that executes information processing in accordance with a program, and
a communication unit that is caused by the processing execution unit to communicate with another one of the integrated circuit chips; and
a mode setting unit capable of setting each of the integrated circuit chips to at least a first mode or a second mode,
wherein each of the plurality of integrated circuit chips includes a plurality of the communication units to be initialized by a common setting terminal, and
the processing execution unit of a first integrated circuit chip set to the first mode starts establishing a communication connection through one of the initialized communication units to one of the communication units of a second integrated circuit chip set to the second mode.

2. The information processing system according to claim 1, wherein
the communication units of the first integrated circuit chip are initialized to a first initial value, and
the communication unit of the second integrated circuit chip to be connected to the first integrated circuit chip is initialized to the first initial value.

3. The information processing system according to claim 2, wherein the processing execution unit of the first integrated circuit chip starts establishing the communication connection through one of the communication units initialized to the first initial value, and configures a setting of the second integrated circuit chip for executing processing.

4. The information processing system according to claim 2, wherein the communication unit of a third integrated circuit chip connected to the second integrated circuit chip and being set to the second mode is initialized to a second initial value.

5. The information processing system according to claim 4, wherein the processing execution unit of the first integrated circuit chip starts establishing the communication connection through one of the communication units initialized to the first initial value, and updates the first initial value set for the communication unit to be connected to the third integrated circuit chip to the second initial value.

6. The information processing system according to claim 4, wherein the processing execution unit of the second integrated circuit chip updates the first initial value set for the communication unit to be connected to the third integrated circuit chip to the second initial value.

7. The information processing system according to claim 1, wherein
the communication units of the first integrated circuit chip are initialized to a first initial value,
the communication unit of the second integrated circuit chip to be connected to the first integrated circuit chip is initialized to the first initial value, and
the communication unit of a third integrated circuit chip to be connected to the first integrated circuit chip is initialized to a second initial value, the third integrated circuit chip being set to the second mode.

8. The information processing system according to claim 7, wherein the processing execution unit of the first integrated circuit chip updates the first initial value set for the communication unit to be connected to the third integrated circuit chip to the second initial value.

9. An image processing apparatus comprising:
the first integrated circuit chip according to claim 1 as a controller chip; and
the second integrated circuit chip according to claim 1 as a printing control chip.

10. A communication control method for an information processing system including
a plurality of integrated circuit chips each including
a processing execution unit that executes information processing in accordance with a program, and
a communication unit that is caused by the processing execution unit to communicate with another one of the integrated circuit chips; and
a mode setting unit capable of setting each of the integrated circuit chips to at least a first mode or a second mode, the communication control method comprising:
initializing a plurality of the communication units included in each of the plurality of integrated circuit chips with a common setting terminal; and
with the processing execution unit of a first integrated circuit chip set to the first mode, starting establishing a communication connection through one of the initialized communication units to one of the communication units of a second integrated circuit chip set to the second mode.

* * * * *